(12) United States Patent
Saito et al.

(10) Patent No.: US 12,325,366 B2
(45) Date of Patent: Jun. 10, 2025

(54) COMPOSITE WIRE HARNESS

(71) Applicant: SUMITOMO WIRING SYSTEMS, LTD., Yokkaichi (JP)

(72) Inventors: Ryuta Saito, Yokkaichi (JP); Katsutoshi Izawa, Yokkaichi (JP); Kosuke Tanaka, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 205 days.

(21) Appl. No.: 18/027,787

(22) PCT Filed: Jul. 29, 2021

(86) PCT No.: PCT/JP2021/028070
§ 371 (c)(1),
(2) Date: Mar. 22, 2023

(87) PCT Pub. No.: WO2022/074907
PCT Pub. Date: Apr. 14, 2022

(65) Prior Publication Data
US 2023/0331177 A1 Oct. 19, 2023

(30) Foreign Application Priority Data
Oct. 5, 2020 (JP) .................. 2020-168190

(51) Int. Cl.
*B60R 16/02* (2006.01)
*H02G 3/04* (2006.01)

(52) U.S. Cl.
CPC ........... *B60R 16/0215* (2013.01); *H02G 3/04* (2013.01)

(58) Field of Classification Search
CPC ........ B60R 16/0215; H02G 3/30; H02G 3/32; H01B 7/40
See application file for complete search history.

(56) References Cited

U.S. PATENT DOCUMENTS

| 7,676,132 B1 * | 3/2010 | Mandry | G02B 6/4478 385/134 |
| 10,790,653 B2 * | 9/2020 | Sugino | H02G 3/34 |

(Continued)

FOREIGN PATENT DOCUMENTS

| JP | 2012-197034 A | 10/2012 |
| JP | 2015-44478 A | 3/2015 |

(Continued)

OTHER PUBLICATIONS

Sep. 14, 2021 International Search Report issued in International Patent Application No. PCT/JP2021/028070.

*Primary Examiner* — Paresh Paghadal
(74) *Attorney, Agent, or Firm* — Oliff PLC

(57) ABSTRACT

A composite wire harness includes: a first wire harness including a first electric wire and a first exterior tube that covers the first electric wire; a second wire harness including a second electric wire and a second exterior tube that covers the second electric wire and is arranged in parallel with the first exterior tube; and a fixing member configured to fix the first wire harness and the second wire harness to each other, wherein: the first wire harness includes a path regulator that is attached to an outer circumferential surface of the first exterior tube, and is configured to regulate a path of the first exterior tube, the path regulator includes an insertion port that extends along a length direction of the path regulator and spans an entire length of the path regulator, and the fixing member fixes the second wire harness to the path regulator.

3 Claims, 4 Drawing Sheets

(56) References Cited

U.S. PATENT DOCUMENTS

| | | | | |
|---|---|---|---|---|
| 2001/0043775 | A1* | 11/2001 | Shirakawa | G02B 6/3829 |
| | | | | 385/59 |
| 2002/0141723 | A1* | 10/2002 | Kent | G02B 6/38875 |
| | | | | 385/100 |
| 2005/0067548 | A1* | 3/2005 | Inoue | F16L 3/26 |
| | | | | 248/68.1 |
| 2006/0233513 | A1* | 10/2006 | Klein | H02G 11/00 |
| | | | | 385/147 |
| 2014/0008501 | A1 | 1/2014 | Satou et al. | |
| 2018/0350486 | A1* | 12/2018 | Egami | H01B 13/01209 |
| 2021/0172804 | A1* | 6/2021 | Patil | A62C 37/04 |

FOREIGN PATENT DOCUMENTS

| | | |
|---|---|---|
| JP | 2018-93570 A | 6/2018 |
| JP | 2018-137906 A | 8/2018 |

* cited by examiner

COMPOSITE WIRE HARNESS

BACKGROUND

The present disclosure relates to a composite wire harness.

JP 2012-197034A discloses a vehicle composite wire harness, for example. The same composite wire harness includes a first wire harness formed by passing a first electric wire through a metal pipe and a second wire harness formed by passing a second electric wire through a corrugated tube made of a synthetic resin. In the first wire harness, the metal pipe covers most of the first electric wire in the length direction thereof, and thus protects the first electric wire from flying objects, water droplets, and the like. Also, the metal pipe regulates the wiring path of the first electric wire. The second wire harness is arranged in parallel with the first wire harness and is linked to the metal pipe. Thus, the metal pipe also regulates the wiring path of the second electric wire of the second wire harness.

SUMMARY

In the aforementioned wire harness, the first electric wire is protected by the metal pipe used to regulate the path of the first electric wire. Here, it is desirable that the diameter of the metal pipe is the smallest diameter possible in order to achieve a reduction in weight and size. However, reducing the diameter of the metal pipe may lead to cases where a component such as a connector attached to an end portion of the first wire harness in the length direction cannot be passed through the metal pipe. Thus, before a component such as a connector is attached to an end portion of the first electric wire in the length direction, the first electric wire needs to be passed through the metal pipe, which leaves room for improvement regarding ease of assembly of a composite wire harness.

An exemplary aspect of the disclosure provides a composite wire harness that makes it possible to improve ease of assembly.

A composite wire harness according to the present disclosure including: a first wire harness including a first electric wire and a first exterior tube that covers the first electric wire; a second wire harness including a second electric wire and a second exterior tube that covers the second electric wire and is arranged in parallel with the first exterior tube; and a fixing member configured to fix the first wire harness and the second wire harness to each other, wherein: the first wire harness includes a path regulator that is attached to an outer circumferential surface of the first exterior tube, and is configured to regulate a path of the first exterior tube, the path regulator includes an insertion port that extends along a length direction of the path regulator and spans an entire length of the path regulator, and the fixing member fixes the second wire harness to the path regulator.

According to the present disclosure, it is possible to provide a composite wire harness that makes it possible to improve ease of assembly.

DETAILED DESCRIPTION OF EMBODIMENTS

Description of Embodiments of Disclosure

Figure 1:
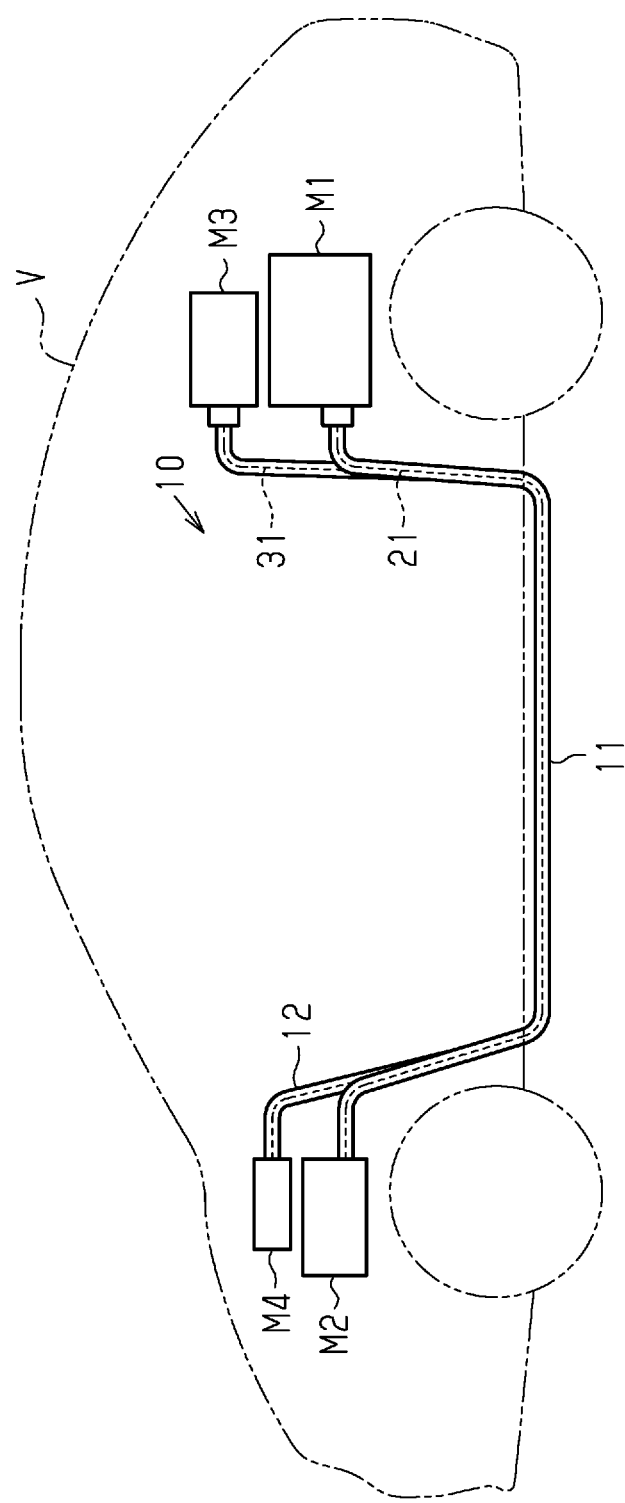
FIG. 1 is a diagram schematically showing a configuration of a composite wire harness according to an embodiment.

First, embodiments of the present disclosure will be listed and described.

A composite wire harness according to the present disclosure includes: (1) a first wire harness including a first electric wire and a first exterior member that covers the first electric wire; a second wire harness including a second electric wire and a second exterior member that covers the second electric wire and is arranged in parallel with the first exterior member; and a fixing member configured to fix the first wire harness and the second wire harness to each other, wherein the first wire harness includes a path regulating member that is attached to an outer circumferential surface of the first exterior member, and is configured to regulate a path of the first exterior member, the path regulating member includes an insertion port that extends along a length direction of the path regulating member and spans the entire length of the path regulating member, and the fixing member fixes the second wire harness to the path regulating member.

With this configuration, once terminal processing such as attaching connectors to end portions in the length direction of the first electric wire has been performed, the path regulating member can be attached to the first exterior member via the insertion port. In this way, the path regulating member can be retrofitted, and thus the ease of assembly of the composite wire harness can be improved.

Also, the second wire harness is fixed to the path regulating member attached to the first exterior member, by the fixing member. Thus, both paths of the first exterior member and the second exterior member arranged parallel to each other can be regulated by the path regulating member attached to the first exterior member.

(2) A plurality of the path regulating members are attached to the first exterior member along a length direction of the first exterior member, and the plurality of path regulating members are spaced apart from each other in the length direction of the first exterior member.

With this configuration, the first exterior member and the second exterior member include regulated sections where the paths thereof are regulated by the path regulating members and other non-regulated sections. Accordingly, in a non-regulated section between adjacent path regulating members, it is possible to, for example, form a bent path of the first exterior member and the second exterior member, which increases the layout freedom of the composite wire harness. Also, when transporting the composite wire harness, the composite wire harness can be folded at a non-regulated section between adjacent path regulating members. In this way, by folding the composite wire harness at a non-regulated section, the composite wire harness can be made more compact. Thus, the transportation efficiency of the composite wire harness can be increased.

(3) The path regulating member includes: a first end portion and a second end portion that are circumferential end portions of the path regulating member and form the insertion port; and a protruding portion that protrudes from at least one inner surface of the first end portion and the second end portion and comes into contact with an outer surface of the first exterior member.

With this configuration, the path regulating member includes a protruding portion that protrudes from at least one inner surface of the first end portion and the second portion, and comes into contact with the outer surface of the first exterior member. Thus, dislodgment of the path regulating member from the first exterior member via the insertion port can be suppressed. Accordingly, the path regulating member is temporarily fixed to the outer circumferential surface of the first exterior member by the protruding portions of the same, and thus the case of attaching a fixing member to the path regulating member temporarily attached to the first exterior member is further improved. As a result, the ease of assembly of the composite wire harness can be further increased.

(4) When the path regulating member is defined as a first path regulating member, the second wire harness includes a second path regulating member that is attached to an outer circumferential surface of the second exterior member, and is configured to regulate the path of the second exterior member, the second path regulating member includes an insertion port that extends along a length direction of the second path regulating member and spans the entire length of the second path regulating member, and when the fixing member is defined as a first fixing member, the second wire harness includes a second fixing member that is configured to fix the first exterior member to the second path regulating member.

With this configuration, the path of the second exterior member can be regulated by the second path regulating member. Furthermore, the second path regulating member and the first path regulating member are fixed to each other by the second fixing member, and the path of the first exterior member can also be regulated by the second path regulating member.

(5) The composite wire harness further comprising an overlapping region where at least a portion of the first path regulating member overlaps the second path regulating member as seen in an alignment direction of the first exterior member and the second exterior member.

With this configuration, by setting the overlapping region where the first path regulating member and the second path regulating member overlap in accordance with the degree of path regulation required for the composite wire harness, more favorable path regulation of the composite wire harness can be realized.

(6) In the overlapping region, a portion in a length direction of the first path regulating member and a portion in a length direction of the second path regulating member overlap as seen in the alignment direction.

With this configuration, even though the first path regulating member and the second path regulating member are disposed shifted from each other in the length direction of the composite wire harness, when the composite wire harness is viewed as a whole, the area regulated by the first path regulating member and the area regulated by the second path regulating member form a continuous area due to the overlapping region. Thus, even if there are length limitations on the first path regulating member and the second path regulating member due to the shape and the like of the vehicle body, the paths of the first exterior member and the second exterior member can be regulated over a large area that is continuous in the length direction of the composite wire harness.

Although the first path regulating member and the second path regulating member are disposed shifted from one another in the length direction of the composite wire harness, the overlapping region is present. Thus, there is no non-regulated section between the regulated section of the first path regulating member and the second path regulating member, and thus it is possible to suppress unintentional bending of the first exterior member and the second exterior member between regulated sections of the first path regulating member and the second path regulating member.

(7) The first fixing member fixes the second path regulating member to the first path regulating member in the overlapping region.

With this configuration, the first path regulating member and the second path regulating member are fixed to each other in the overlapping region by the first fixing member, and thus more favorable path regulation of the composite wire harness can be realized.

(8) The entire length of the first path regulating member overlaps a portion of the second exterior member where the second path regulating member is not attached, as seen in an alignment direction of the first exterior member and the second exterior member.

With this configuration, a section of the first exterior member that cannot be regulated by the first path regulating member can be regulated by the second path regulating member, and the first exterior member and the second exterior member can be bent at a non-regulated section between the regulated section of the first path regulating member and the regulated section of the second path regulating member. As a result, a contribution can be made to an increase in the layout freedom of the composite wire harness.

DESCRIPTION OF EMBODIMENTS OF DISCLOSURE

Specific examples of a composite wire harness according to the present disclosure will be described below with reference to the drawings. Parts of structures may be exaggerated or simplified in the drawings for ease of description. Also, dimensional ratios of parts may differ between drawings. The term "orthogonal" as used in the present specification does not only include being exactly orthogonal but also includes being substantially orthogonal within a range in which the functions and effects according to the embodiment are achieved.

Note that "tubular" used in the description of the present specification does not only include a tubular shape formed by a peripheral wall that is continuous over the entirety of the circumferential direction thereof but also includes tubular shapes formed by combining two or more components and tubular shapes from which a portion thereof is missing in the circumferential direction such as is the case with a C-shape. Also, a tubular shape includes circular shapes, oval shapes, and polygonal shapes that have pointed or round corners. Also, the term "annular" used in the description of the present specification refers to any structure that forms a loop or an ordinary loop-shaped structure that has a continuous shape without an end portion and a structure that has a gap, such as a C-shaped structure. Note that an annular shape includes a circular shape, an oval shape, and a polygonal shape that has pointed or rounded corners, but is not limited thereto.

Overall Configuration of Composite Wire Harness 10

A composite wire harness 10 shown in FIG. 1 is, for example, a wire harness that connects devices provided in a vehicle V to each other. The composite wire harness 10 is disposed in the vehicle V such that an intermediate portion of the composite wire harness 10 in the length direction thereof extends outside the vehicle interior, such as under the floor of the vehicle V.

The composite wire harness 10 includes a first wire harness 11 and a second wire harness 12 that are disposed parallel to each other. Also, the composite wire harness 10 includes a fixing member 13 shown in FIG. 2. The fixing member 13 fixes the first wire harness 11 and the second wire harness 12 to each other. Note that the fixing member 13 is not shown in FIG. 1.

As shown in FIG. 1, the first wire harness 11 electrically connects a first device M1 and a second device M2 provided in the vehicle V to each other. As examples of the first device M1 and the second device M2, the first device M1 is a high-voltage battery disposed toward the rear side of the vehicle V, and the second device M2 is an inverter disposed toward the front side of the vehicle V. The first device M1, which is a high-voltage battery, is a battery that can supply a voltage of 100 or more volts, for example. The second device M2, which is an inverter, is connected to a wheel driving motor (not shown) that serves as a motive power source for travel by the vehicle. The inverter generates AC power from DC power from the high-voltage battery and supplies the resulting AC power to the motor. The first wire harness 11 is a high-voltage wire harness that allows the passage of high voltages between the high-voltage battery and the inverter.

The second wire harness 12 electrically connects a third device M3 and a fourth device M4 provided in the vehicle V to each other. As examples of the third device M3 and the fourth device M4, the third device M3 is a low-voltage battery that is disposed toward the rear side of the vehicle V, and the fourth device M4 is a relay box disposed toward the front side of the vehicle V. The fourth device M4, which is a relay box, distributes the voltage of the low-voltage battery to various devices installed in the vehicle V. The second wire harness 12 is a low-voltage wire harness that can support currents supplied from the low-voltage battery. Note that the first wire harness 11 and the second wire harness 12 are formed so as to be bent two or three dimensionally so as to match a wiring path Configuration of First Wire Harness 11

Figure 3:
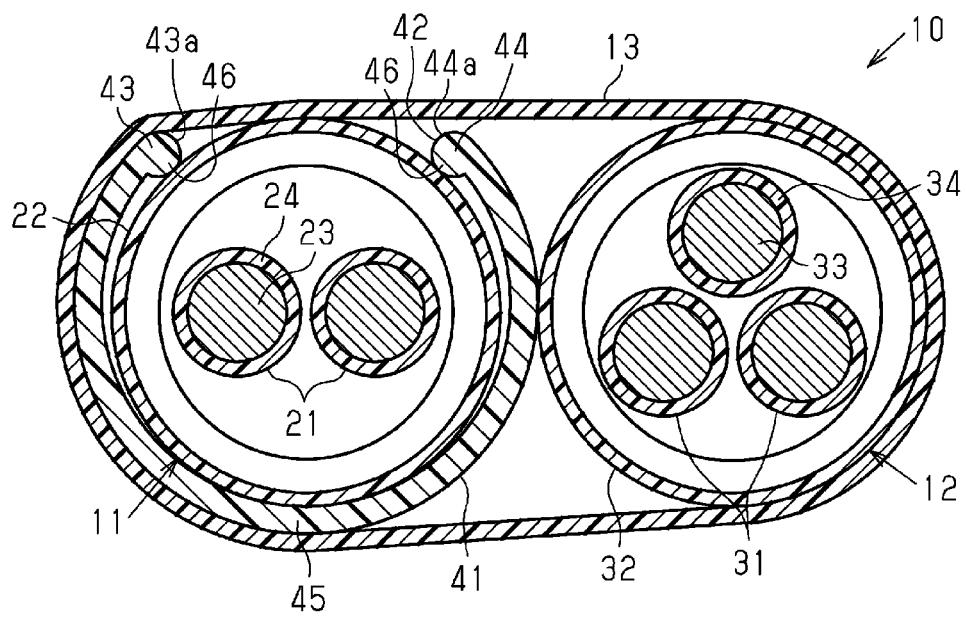
FIG. 3 is a cross-sectional view taken along line 3-3 in FIG. 2.

As shown in FIG. 3, the first wire harness 11 includes a first electric wire 21 and a first exterior member 22 (first exterior tube). More than one first electric wire 21 is provided, for example. The first exterior member 22 has a cylindrical shape, for example. The first exterior member 22 collectively encloses the first electric wires 21. Note that one end portion of each first electric wire 21 is connected to the first device M1 and the other end portion of each first electric wire 21 is connected to the second device M2. The first electric wires 21 are high-voltage electric wires that can support high voltages and large currents.

Each first electric wire 21 includes a first core wire 23 and a first insulating coating 24 that covers the outer circumferential surface of the first core wire 23. The first core wire 23 is made of a flexible conductor that is easy to bend, for example. Note that an example of the flexible conductor is a twisted wire formed by twisting metal strands together, for example. A metal material such as a copper- or aluminum-based material can be used as the material of the first core wire 23, for example. Also, the shape of a transverse cross-section obtained by cutting the first core wire 23 along a plane orthogonal to the length direction of the first core wire 23 can be any shape. The transverse cross-sectional shape of the first core wire 23 can be a circular shape, a semicircular shape, a polygonal shape, a square shape, a flat shape, or the like.

The first insulating coating 24 covers the outer circumferential surface of the first core wire 23 over the entire circumference thereof, for example. The first insulating coating 24 is made of an insulating material such as a synthetic resin, for example. The first insulating coating 24 can be formed by performing extrusion molding on the first core wire 23, for example.

The first exterior member 22 has an overall elongated tubular shape. The first electric wires 21 are inserted into the internal space of the first exterior member 22. The first exterior member 22 protects the first electric wires 21 from flying objects and water droplets, for example.

The first exterior member 22 is constituted by a corrugated tube made of a synthetic resin, for example. The first exterior member 22, which is a corrugated tube, has a bellows shape in which larger and smaller diameters are repeated in the length direction. Thus, the first exterior member 22 is flexible and easy to bend. Note that, as the material forming the first exterior member 22, synthetic resins such as polyolefin, polyamide, polyester, and ABS resin can be used.

Configuration of Second Wire Harness 12

As shown in FIG. 3, the second wire harness 12 includes a second electric wire 31 and a second exterior member 32 (second exterior tube). More than one second electric wire 31 is provided, for example. The second exterior member 32 has a cylindrical shape, for example. The second exterior member 32 collectively encloses the second electric wires 31, for example. Note that one end portion of each second electric wire 31 is connected to the third device M3, and the other end portion of each second electric wire 31 is connected to the fourth device M4. The second electric wires 31 are low-voltage electric wires.

Each second electric wire 31 includes a second core wire 33 and a second insulating coating 34 that covers the outer circumferential surface of the second core wire 33. The second core wire 33 is formed by a flexible conductor that is easy to bend, for example. Note that an example of the flexible conductor is a twisted wire formed by twisting metal strands together, for example. A metal material such as a copper- or aluminum-based material can be used as the material of the second core wire 33, for example. Also, the shape of a transverse cross-section obtained by cutting the second core wire 33 along a plane orthogonal to the length direction of the second core wire 33 can be any shape. The transverse cross-sectional shape of the second core wire 33 can be a circular shape, a semicircular shape, a polygonal shape, a square shape, a flat shape, or the like.

The second insulating coating 34 covers the outer circumferential surface of the second core wire 33 over the entire circumference thereof, for example. The second insulating coating 34 is made of an insulating material such as a synthetic resin, for example. The second insulating coating 34 can be formed by performing extrusion molding on the second core wire 33, for example.

The second exterior member 32 has an overall elongated tubular shape. The second electric wires 31 are inserted into the internal space of the second exterior member 32. The second exterior member 32 protects the second electric wires 31 from flying objects and water droplets, for example.

The second exterior member 32 is constituted by a corrugated tube made of a synthetic resin, for example. The second exterior member 32, which is a corrugated tube, has a bellows shape in which larger and smaller diameters are repeated in the length direction. Thus, the second exterior member 32 is flexible and easy to bend. Note that, as the material forming the second exterior member 32, synthetic resins such as polyolefin, polyamide, polyester, and ABS resin can be used.

Configuration of First Path Regulating Member 41

Figure 2:
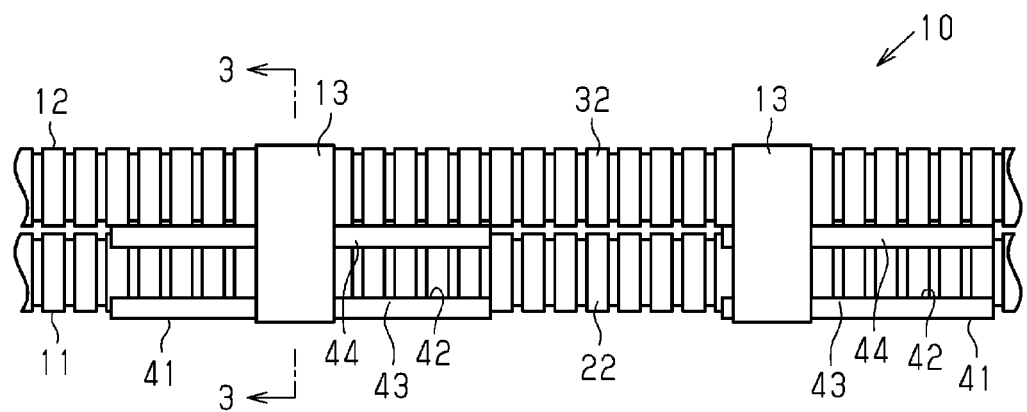
FIG. 2 is a plan view of the composite wire harness of the same embodiment.

As shown in FIG. 2, the first wire harness 11 includes a first path regulating member 41 (path regulator) that regulates the path of the first exterior member 22. The first path regulating member 41 is attached to the outer circumferential surface of the first exterior member 22. The first path regulating member 41 covers a circumferential portion of the outer circumferential surface of the first external member 22. For example, the first path regulating member 41 covers an area greater than 180° of the outer circumference of the first external member 22. Also, the first path regulating member 41 extends along the length direction of the first exterior member 22.

The first path regulating member 41 assists the first exterior member 22 so as to keep the first exterior member 22 from sagging under its own weight or the like and deviating from a predetermined path. The first path regulating member 41 is partially provided in the length direction of the first external member 22. For example, the first path regulating member 41 is attached to the outer circumferential surface of a portion of the first external member 22 that extends linearly along the path of the first external member 22. Also, more than one first path regulating member 41 is provided in the length direction of the first exterior member 22, for example. The first path regulating members 41 are spaced apart from each other in the length direction of the first exterior member 22, for example. Also, the first path regulating members 41 differ in length in the length direction of the first external member 22, for example.

Note that a synthetic resin such as polypropylene, polyamide, polyacetal, and the like can be used as the material of the first path regulating members 41, for example. Each first path regulating member 41 can be molded using a known method such as extrusion molding and injection molding, for example.

Figure 4:
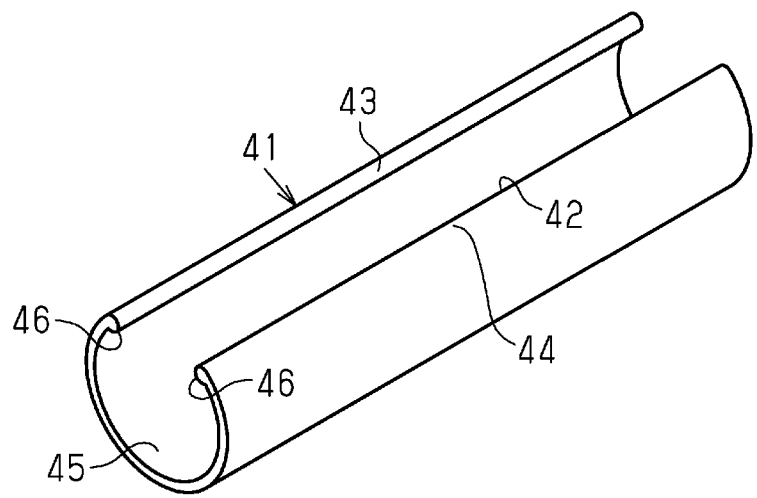
FIG. 4 is a perspective view of a first path regulating member of the same embodiment.
Figure 5:
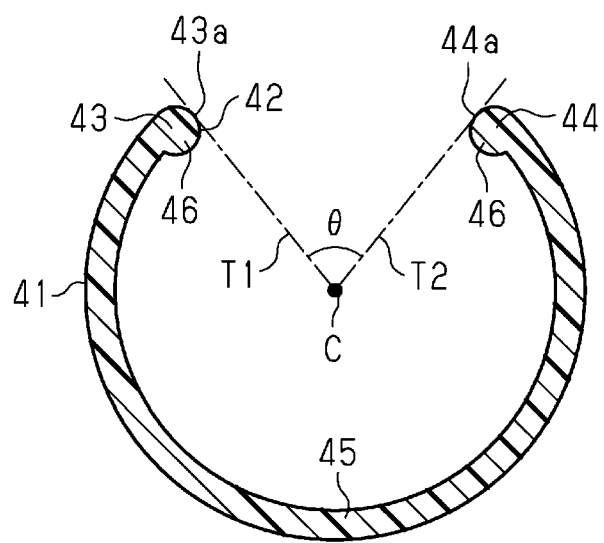
FIG. 5 is a cross-sectional view of the first path regulating member of the same embodiment.

As shown in FIGS. 4 and 5, the first path regulating member 41 includes an insertion port 42 that extends along the length direction of the first path regulating member 41, a first end portion 43 and a second end portion 44 that form the insertion port 42, and an intermediate portion 45 that joins the first end portion 43 and the second end portion 44. Specifically, the first path regulating member 41 includes the intermediate portion 45 that is formed so as to cover a circumferential portion of the first exterior member 22, the first end portion 43 and the second end portion 44 respectively provided at two end portions of the intermediate portion 45, and the insertion port 42 formed by the first end portion 43 and the second end portion 44.

The first end portion 43 and the second end portion 44 are circumferential end portions of the first path regulating member 41. The first end portion 43 and the second end portion 44 oppose each other in a state where they are separated from each other in the circumferential direction of the first path regulating member 41. The insertion port 42 is formed by the gap between the first end portion 43 and the second end portion 44.

The insertion port 42 spans the entire length of the first path regulating member 41. The opening width of the insertion port 42, that is, the shortest distance between the first end portion 43 and the second end portion 44 is smaller than the outer diameter of the first exterior member 22. The first exterior member 22 is inserted into the insertion port 42 along a direction that is orthogonal to the length direction of the first path regulating member 41.

As shown in FIG. 5, the intermediate portion 45 forms the main portion of the first path regulating member 41. The transverse cross-sectional shape of the intermediate portion 45 is an arc shape, for example. Note that the thickness in the radial direction of the intermediate portion 45 is constant in the circumferential direction, for example. The transverse cross-sectional shape of the first path regulating member 41 is constant over the entire length of the first path regulating member 41, for example. Also, the central axial line C of the transverse cross-section of the intermediate portion 45 is a straight line, for example. That is, the first path regulating member 41 is shaped so as to extend linearly in one direction.

As shown in FIG. 5, in a transverse cross-section of the first path regulating member 41, the tangent of the first end portion 43 passing through the central axial line C of the intermediate portion 45 is a tangent T1, and the tangent of the second end portion 44 passing through the central axial line C is a tangent T2. In the first path regulating member 41 not attached to the first exterior member 22, the opening angle $\theta$ of the opening port 42 in the circumferential direction of the first path regulating member 41 falls within a range from 60° to 120°, for example. Note that the opening angle $\theta$ of the insertion port 42 is an angle centered on the central axial line C of the opening portion 45, that is, an angle formed by the tangent lines T1 and T2.

The first path regulating member 41 includes protruding portions 46 (protrusions) that respectively protrude from the inner surfaces of the first end portion 43 and the second end portion 44. The transverse cross-sectional shape of each protruding portion 46 is semicircular, for example. The protruding portions 46 extend along the length direction of the first path regulating member 41, for example. Also, the protruding portions 46 span the entire length of the first path regulating member 41, for example.

As shown in FIG. 3, the protruding portions 46 protrude toward the first exterior member 22. The protruding portions 46 come into contact with the outer surface of the first exterior member 22. The protruding portions 46 press the first exterior member 22, for example. The first exterior member 22 is elastically sandwiched by the protruding portions 46 and the intermediate portion 45. Thus, the linkage between the first exterior member 22 and the first path regulating member 41 is firm. Accordingly, the first path regulating member 41 attached to the outer circumferential surface of the first exterior member 22 is suppressed from moving in the length direction of the first exterior member 22.

In a state where the first exterior member 22 is inserted into the first path regulating member 41, the opening width of the insertion port 42 does not necessarily return to its original width, that is, the width of the insertion port 42 of the first path regulating member 41 prior to insertion of the first exterior member 22. Specifically, as a result of the first exterior member 22 hampering elastic deformation undergone by the first path regulating member 41 in order to return to its original shape, the opening width of the insertion port 42 may be slightly larger than the original opening width. There are also cases where the first exterior member 22 sags as a result of being pressed by the first path regulating member 41 while the first exterior member 22 is inserted into the first path regulating member 41, and thus the opening width of the insertion port 42 returns to the original opening width. Specifically, the opening width in the state where the first exterior member 22 is inserted into the first path regulating member 41 is of a size that is based on the rigidity and bendability of the first exterior member 22 and the first path regulating member 41.

In the first path regulating member 41, a leading end 43a in the circumferential direction of the first end portion 43 and a leading end 44a in the circumferential direction of the second end portion 44 are each curved as seen in the length direction of the first path regulating member 41. In other words, the leading end 43a of the first end portion 43 and the leading end 44a of the second end portion 44 have curved transverse cross-sectional shapes. It should be noted that the insertion port 42 is formed by the leading end 43a of the first end portion 43 and the leading end 44a of the second end portion 44.

Configuration of Fixing Member 13

The fixing members 13 fix the second wire harness 12 to the first path regulating member 41. In the present embodiment, the fixing members 13 fix the first path regulating member 41 and the second exterior member 32 to each other. A plurality of fixing members 13 are provided respectively corresponding to the first path regulating members 41. That is, the first path regulating members 41 are fixed to the second exterior member 32 by the fixing members 13, respectively.

The fixing members 13 are band-shaped members such as a metal or synthetic resin band or a piece of adhesive tape. Each fixing member 13 is collectively wrapped around the first path regulating member 41 and the second exterior member 32 arranged parallel to each other. The first path regulating member 41 and the second exterior member 32 are fixed by the fixing members 13 so as not to move apart from one another, for example.

Operations of the present embodiment Will be described.

With the composite wire harness 10 of the present embodiment, at the portions where the first path regulating members 41 are attached, the rigidity of the first path regulating members 41 keeps the first exterior member 22 from sagging under its own weight or the like. Also, the second exterior member 32 is fixed to the first path regulating members 41 by the fixing members 13. Thus, the second exterior member 32 is also kept from sagging under its own weight or the like by the first path regulating members 41. In this manner, both paths of the first exterior member 22 and the second exterior member 32 can be regulated by the first path regulating members 41.

Note that, in a conventional configuration, the first exterior member 22 is a hard pipe member such as a metal pipe, and protection and path regulation of the first electric wires 21 are both realized by the pipe member. In such a configuration, the pipe member is long and the pipe member needs to be bent at bend portions along the path of the first electric wires 21 using a bending machine. The bending is a troublesome task. However, in the composite wire harness 10 of the present embodiment, the first path regulating members 41 are correspondingly attached to linear portions of the path of the first exterior member 22.

Effects of the present embodiment will be described.

(1) The first path regulating member 41 includes the insertion port 42 that extends along the length direction of the first path regulating member 41 and spans the entire length of the first path regulating member 41. Thus, the first exterior member 22 can be inserted into the first path regulating member 41 from the insertion port 42. Accordingly, once terminal processing such as attaching connectors to end portions in the length direction of the first electric wires 21 has been performed, the first path regulating member 41 can be attached to the first exterior member 22 via the insertion port 42. In this way, the first path regulating member 41 can be retrofitted, and thus the ease of assembly of the composite wire harness 10 can be improved. Also, the first path regulating member 41 can be appropriately retrofitted to sections along the path of the composite wire harness 10 that require regulation, and thus unnecessary path regulation that occurs when a long pipe member is used can be suppressed.

Also, the second wire harness 12 is fixed to the first path regulating member 41 attached to the first exterior member 22, by the fixing member 13. Thus, the first path regulating member 41 can regulate the paths of both the first exterior member 22 and the second exterior member 32 that are arranged in parallel to each other. This accordingly contributes to suppressing an increase in the number of components of the composite wire harness 10.

(2) A plurality of the first path regulating members 41 are attached to the first exterior member 22 along the length direction of the first exterior member 22. The first path regulating members 41 are separated from each other in the length direction of the first exterior member 22. With this configuration, the first exterior member 22 and the second exterior member 32 include regulated sections where the paths thereof are regulated by the first path regulating members 41 and other non-regulated sections. Accordingly, in a non-regulated section between adjacent first path regulating members 41, it is possible to, for example, form a bent path of the first exterior member 22 and the second exterior member 32, which increases the layout freedom of the composite wire harness 10.

Also, when transporting the composite wire harness 10, the composite wire harness 10 can be folded at a non-regulated section between adjacent first path regulating members 41. In this way, by folding the composite wire harness 10 at a non-regulated section, the composite wire harness 10 can be made more compact. Thus, the transportation efficiency of the composite wire harness 10 can be increased.

(3) The first path regulating member 41 includes the first end portion 43 and the second end portion 44 that are circumferential end portions of the first path regulating member 41 and form the insertion port 42. The first path regulating member 41 includes the protruding portions 46 that respectively protrude from the inner surfaces of the first end portion 43 and the second end portion 44 and come into contact with the outer surface of the first exterior member 22. With this configuration, dislodgment of the first path regulating member 41 from the first exterior member 22 via the insertion port 42 can be suppressed. Accordingly, the first path regulating member 41 is temporarily fixed to the outer circumferential surface of the first exterior member 22 by the protruding portions 46 of the first path regulating member 41, and thus the ease of attaching a fixing member 13 to the first path regulating member 41 temporarily attached to the first exterior member 22 is further improved. As a result, the ease of assembly of the composite wire harness 10 can be further increased.

(4) The leading end 43a of the first end portion 43 and the leading end 44a of the second end portion 44 are curved as seen in the length direction of the first path regulating member 41. Thus, the first exterior member 22 can be smoothly inserted into the first path regulating member 41 via the insertion port 42 formed by the leading ends 43a and 44a. Also, the first exterior member 22 is unlikely to be damaged when the first exterior member 22 is inserted into the first path regulating member 41 via the insertion port 42.

(5) The transverse cross-sectional shape of the first path regulating member 41 is the same along the entire length of the first path regulating member 41. With this configuration, by using an extrusion molder that extrudes the raw material of the first path regulating member 41 in the length direction, the first path regulating member 41 can be easily manufactured. Also, various types of first path regulating members 41 with varying lengths can be manufactured using a single extrusion molder.

(6) The protruding portions 46 extend along the entire length of the first path regulating member 41. With this configuration, the bending rigidity of the first path regulating member 41 can be increased. Also, the protruding portions 46 come into contact with the outer surface of the first exterior member 22 over the entire length of the first path regulating member 41. Thus, dislodgment of the first path regulating member 41 from the first exterior member 22 via the insertion port 42 can be suppressed along the entire length of the first path regulating member 41

The present embodiment can be implemented with the following modifications. The present embodiment and the following modified examples can be implemented in combination with each other, provided no technical contradiction arises.

In the above embodiment, a path regulating member for regulating the path of the second exterior member 32 may also be provided in the second wire harness 12. Examples where a second path regulating member 51 (second path regulator) is attached to the second exterior member 32 of the second wire harness 12 are shown in FIGS. 6 and 7.

The second path regulating member 51 has the same configuration as the first path regulating member 41, for example. The configurations of the second path regulating member 51 that are the same as those of the first path regulating member 41 are given the same reference signs and description thereof is omitted.

Figure 6:
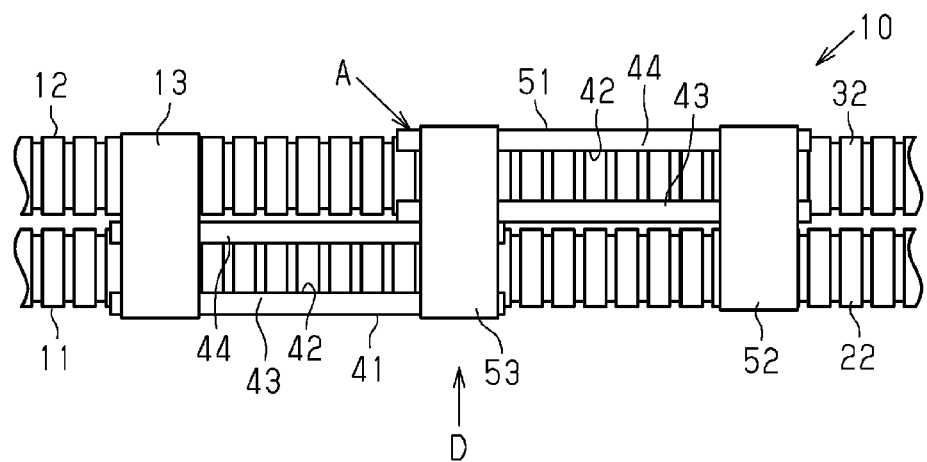
FIG. 6 is a plan view of a composite wire harness according to a modified example.
Figure 7:
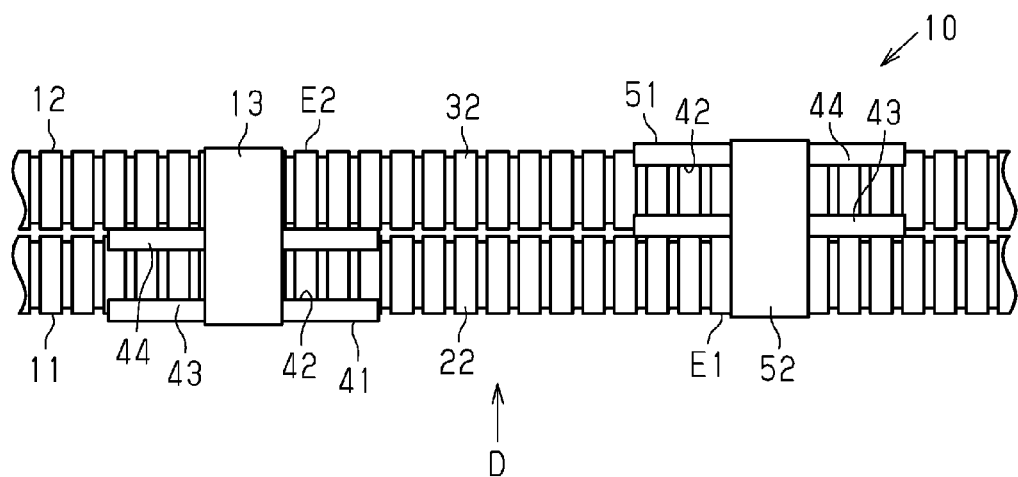
FIG. 7 is a plan view of a composite wire harness according to a modified example.

As shown in FIG. 6, the second wire harness 12 includes the second path regulating member 51 that regulates the path of the second exterior member 32. The second path regulating member 51 is attached to the outer circumferential surface of the second exterior member 32. The second path regulating member 51 covers a circumferential portion of the outer circumferential surface of the second exterior member 32. For example, the second path regulating member 51 covers an area greater than 180° of the outer circumference of the second external member 32. Also, the second path regulating member 51 extends along the length direction of the second exterior member 32.

The second path regulating member 51 assists the second exterior member 32 so as to keep the second exterior member 32 from sagging under its own weight or the like and deviating from a predetermined path. The second path regulating member 51 is partially provided in the length direction of the second exterior member 32. For example, the second path regulating member 51 is attached to the outer circumferential surface of a portion of the second external member 32 that extends linearly along the path of the second external member 32. Also, more than one second path regulating member 51 may be provided in the length direction of the second exterior member 32, for example.

The composite wire harness 10 has an overlapping region A where the first path regulating member 41 and the second path regulating member 51 overlap, as seen from an alignment direction D of the first exterior member 22 and the second exterior member 32. In the overlapping region A, a portion in the length direction of the first path regulating member 41 and a portion in the length direction of the second path regulating member 51 overlap when seen in the alignment direction D.

The composite wire harness 10 includes fixing members 13, 52, and 53 that fix the first wire harness 11 and the second wire harness 12 to each other. Similarly to the above embodiment, the fixing member 13 fixes the first path regulating member 41 and the second exterior member 32 to each other. The fixing member 52 fixes the second path regulating member 51 and the first exterior member 22 to each other. Also, the fixing member 53 fixes the second path regulating member 51 and the first path regulating member 41 to each other in the overlapping region A. The fixing members 13 and 53 may be referred to as a first fixing member. The fixing member 52 may be referred to as a second fixing member.

Note that the fixing members 52 and 53 are band-shaped members such as a metal or synthetic resin band or a piece of adhesive tape.

The fixing member 52 is collectively wrapped around the second path regulating member 51 and the first exterior member 22 arranged parallel to each other. The second path regulating member 51 and the first exterior member 22 are fixed by the fixing member 52 so as not to move away from each other, for example.

The fixing member 53 is collectively wrapped around the second path regulating member 51 and the first exterior member 22 arranged parallel to each other. The second path regulating member 51 and the first exterior member 22 are fixed by the fixing member 53 so as not to move away from each other, for example Next, effects of the configuration shown in FIG. 6 will be described.

The second path regulating member 51 includes an insertion port 42 that extends along the length direction of the second path regulating member 51 and spans the entire length of the second path regulating member 51. Also, the composite wire harness 10 includes the fixing member 52 that fixes the first exterior member 22 to the second path regulating member 51. With this configuration, the path of the second exterior member 32 can be regulated by the second path regulating member 51. Furthermore, the second path regulating member 51 and the first exterior member 22 are fixed to each other by the fixing member 52, and thus the path of the first exterior member 22 can also be regulated by the second path regulating member 51

Also, the composite wire harness 10 includes the overlapping region A where the first path regulating member 41 and the second path regulating member 51 overlap as seen from the alignment direction D of the first exterior member 22 and the second exterior member 32. With this configuration, by setting the overlapping region A where the first path regulating member 41 and the second path regulating member 51 overlap in accordance with the degree of path regulation required for the composite wire harness 10, more favorable path regulation of the composite wire harness 10 can be realized.

Also, in the overlapping region A, a portion in the length direction of the first path regulating member 41 and a portion in the length direction of the second path regulating member 51 overlap when seen in the alignment direction D. With this configuration, even though the first path regulating member 41 and the second path regulating member 51 are disposed shifted from each other in the length direction of the composite wire harness 10, when the composite wire harness 10 is viewed as a whole, the area regulated by the first path regulating member 41 and the area regulated by the second path regulating member 51 form a continuous area due to the overlapping region A. Thus, even if there are length limitations on the first path regulating member 41 and the second path regulating member 51 due to the shape and the like of the vehicle body, the paths of the first exterior member 22 and the second exterior member 32 can be regulated over a large area that is continuous in the length direction of the composite wire harness 10.

Although the first path regulating member 41 and the second path regulating member 51 are disposed shifted from one another in the length direction of the composite wire harness 10, the overlapping region A is present. Thus, there is no non-regulated section between the regulated section of the first path regulating member 41 and the second path regulating member 51, and thus it is possible to suppress unintentional bending of the first exterior member 22 and the second exterior member 32 between regulated sections of the first path regulating member 41 and the second path regulating member 51.

Also, the fixing member 53 fixes the second path regulating member 51 to the first path regulating member 41 in the overlapping region A. With this configuration, the first path regulating member 41 and the second path regulating member 51 are fixed to each other by a first fixing member in the overlapping region A, and thus further favorable path regulation of the composite wire harness 10 can be realized.

Next, the configuration shown in FIG. 7 will be described.

In the configuration shown in FIG. 7, the entire length of the first path regulating member 41 as seen in the alignment direction D of the first exterior member 22 and the second exterior member 32 overlaps a portion E2 where the second path regulating member 51 is not attached to the second exterior member 32. Also, the entire length of the second path regulating member 51 as seen in the alignment direction D overlaps a portion E1 where the first path regulating member 41 is not attached to the first exterior member 22.

With this configuration, a section of the first exterior member 22 that cannot be regulated by the first path regulating member 41 can be regulated by the second path regulating member 51, and the first exterior member 22 and the second exterior member 32 can be bent at a non-regulated section between the regulated section of the first path regulating member 41 and the regulated section of the second path regulating member 51. As a result, a contribution can be made to an increase in the layout freedom of the composite wire harness 10.

The entire length of the first path regulating member 41 as seen in the alignment direction D of the first exterior member 22 and the second exterior member 32 may be configured so as to overlap the second path regulating member 51. Also, the entire length of the second path regulating member 51 as seen in the alignment direction D of the first exterior member 22 and the second exterior member 32 may be configured so as to overlap the first path regulating member 41.

In the first path regulating member 41, the protruding portions 46 may be partially provided in the length direction of the first path regulating member 41. In the second path regulating member 51, the protruding portions 46 may be partially provided in the length direction of the second path regulating member 51.

At least one of the protruding portion 46 of the first end portion 43 and the protruding portion 46 of the second portion 44 may be omitted from at least one of the first path regulating member 41 and the second path regulating member 51.

In the first path regulating member 41, a second protruding portion may be provided so as to protrude from the inner surface of the intermediate portion 45 and come into contact with the outer surface of the first exterior member 22. Also, in the second path regulating member 51, a second protruding portion may be provided so as to protrude from the inner surface of the intermediate portion 45 and come into contact with the outer surface of the second exterior member 32. With such a configuration, both the protruding portions 46 and the second protruding portion can be brought into contact with the outer surface of the first exterior member 22 and the second exterior member 32, and consequently, rattling of the first path regulating member 41 and the second path regulating member 51 can be suppressed.

In at least one of the first path regulating member 41 and the second path regulating member 51, a groove extending along the length direction may be provided in the outer circumferential surface of the intermediate portion 45. With this configuration, the intermediate portion 45 can easily deform toward the outer circumference side starting from the groove, and thus the insertion port 42 can be easily widened. As a result, a contribution can be made to an increase in the attachability of the first path regulating member 41 and the second path regulating member 51.

In at least one of the first path regulating member 41 and the second path regulating member 51, a configuration may be employed where the radial thickness of the intermediate portion 45 varies in the circumferential direction.

The shape of at least one intermediate portion 45 of the first path regulating member 41 and the second path regulating member 51 is not limited to an arc shape, and can be changed to an elliptical shape or the like.

In the above embodiment, two end portions of the first path regulating member 41 may be fixed to the second wire harness 12 by a fixing member 13.

The fixing members 13, 52, and 53 are not limited to being band-shaped members and the configuration thereof may be modified as necessary.

While no specific mention is made in the above embodiment and the modification examples shown in FIGS. 6 and 7, the first path regulating member 41 or the second path regulating member 51 may be fixed to a vehicle body via a fixing member or the like.

In the above embodiment and modification examples shown in FIGS. 6 and 7, a configuration may be employed where a slit extending along the length direction is provided in the first exterior member 22, and the first path regulating member 41 can be fixed to the slit. Also, in the modification examples shown in FIGS. 6 and 7, a configuration may be employed where a slit extending along the length direction is provided in the second exterior member 32, and the second path regulating member 51 can be fixed to the slit.

The number of first path regulating members 41 to be attached to the first exterior member 22 may be one. Also, the number of second path regulating members 51 to be attached to the second exterior member 32 may be one.

In the above embodiment, the first electric wires 21 are high-voltage electric wires, and the second electric wires 31 are low-voltage wires, but the present disclosure is not limited to this, and the first electric wires 21 and the second electric wires 31 may each be high-voltage electric wires or low-voltage electric wires.

As shown in FIGS. 2, 3, 6, and 7, when the first path regulating member 41 is attached to the first exterior member 22, a portion of the outer circumferential surface of the first exterior member 22 is exposed from the insertion port 42 of the first path regulating member 41. The exposed portion of the outer circumferential surface of the first exterior member 22 may be referred to as a first exposed portion. At least a portion of the first exposed portion of the first exterior member 22 may be covered by the fixing members 13 and 53. At least a portion of the first exposed portion of the first exterior member 22 may be in contact with the fixing members 13 and 53. Similarly to the first exterior member 22, the second exterior member 32 may have a second exposed portion where the second path regulating member 51 is exposed from the insertion port 42. At least a portion of the second exposed portion of the second exterior member 32 may be covered by the fixing members 52 and 53. At least a portion of the second exposed portion of the second exterior member 32 may be in contact with the fixing members 52 and 53.

[Supplementary Note 1] In several aspects of the present disclosure, a first exterior member (22) may be inserted via an insertion port (42), and a circumferential portion of the outer surface of the first exterior member (22) may be covered by a first path regulating member (41).

[Supplementary Note 2] As shown in FIGS. 2, 6, and 7, in several aspects of the present disclosure, a composite wire harness (10) can include:

at a first length position and a second length position different from the first length position, a plurality of wire harnesses including a first wire harness (11) and a second wire harness (12);

a plurality of fixing members (13; 52, 53) for fixing the first wire harness (11) and the second wire harness (12) so as to be parallel; and a first path regulating member (41) that has a predetermined length profile that can be a straight profile and a predetermined cross-section profile that can be a C-shaped cross-section profile, and is configured to be attached through snap-fitting or the like to an outer circumferential surface of the first wire harness (11) at the first length position, and to regulate a length shape of the first wire harness (11) at the first length position, wherein one of the fixing members (13; 52, 53) may be configured to come into contact with and bundle a portion of the outer circumferential surface of the first wire harness (11) at the first length position, a portion of an outer circumferential surface of the second wire harness (12) at the first length position, and a portion of an outer circumferential surface of the path regulating member (41) at the first length position, and may be a band or piece of tape, for example.

[Supplementary Note 3] As shown in FIG. 2, in several aspects of the present disclosure, a composite wire harness (10) can include:

another first path regulating member (41) that has a predetermined length profile that can be a straight profile and a predetermined cross-section profile that can be a C-shaped cross-section profile, and is configured to be attached through snap-fitting or the like to an outer circumferential surface of the first wire harness (11) at the second length position, and to regulate a length shape of the first wire harness (11) at the second length position, and another fixing member (13; 52, 53) may be configured to come into contact with and bundle a portion of the outer circumferential surface of the first wire harness (11) at the second length position, a portion of an outer circumferential surface of the second wire harness (12) at the second length position, and a portion of an outer circumferential surface of the other path regulating member (41) at the second length position, and may be a band or piece of tape, for example.

[Supplementary Note 4] As shown in FIGS. 6 and 7, in several aspects of the present disclosure, a composite wire harness (10) can include:

another path regulating member (51) that has a predetermined length profile that can be a straight profile and a predetermined cross-section profile that can be a C-shaped cross-section profile, and is configured to be attached through snap-fitting or the like to an outer circumferential surface of the second wire harness (12) at the second length position, and to regulate a length shape of the second wire harness (12) at the second length position, and another one (52) of the fixing members (13; 52, 53) may be configured to come into contact with and bundle a portion of the outer circumferential surface of the first wire harness (11) at the second length position, a portion of an outer circumferential surface of the second wire harness (12) at the second length position, and a portion of an outer circumferential surface of the other path regulating member (51) at the second length position, and may be a band or piece of tape, for example.

[Supplementary Note 5] As shown in FIGS. 2, 6, and 7, in several aspects of the present disclosure, the path regulating member (41) may be attached only at the first length position of the first wire harness (11) of the plurality of wire harnesses, and the path regulating member (41) may not be attached at the first length position of the second wire harness (12) of the plurality of wire harnesses.

[Supplementary Note 6] As shown in FIG. 2, in several aspects of the present disclosure, the other path regulating member (41) may only be attached at the second length position of the first wire harness (11) of the plurality of wire harnesses, and the other path regulating member (41) may not be attached at the second length position of the second wire harness (12) of the plurality of wire harnesses.

[Supplementary Note 7] As shown in FIGS. 6 and 7, in several aspects of the present disclosure, the other path regulating member (51) may be attached only at the second length position of the second wire harness (12) of the plurality of wire harness, and the other path regulating member (51) may not be attached at the second length position of the first wire harness (11) of the plurality of wire harnesses.

[Supplementary Note 8] As shown in FIGS. 2 and 7, in several aspects of the present disclosure, another path regulating member (41; 51) attached at the second length position may partially overlap a path regulating member (41) attached at the first length position, in a length direction.

[Supplementary Note 9] As shown in FIG. 6, in several aspects of the present disclosure, another path regulating member (51) attached at the second length position may not completely overlap a path regulating member (41) attached at the first length position, in a length direction.

[Supplementary Note 10] As shown in FIG. 3, in several aspects of the present disclosure, a radially inward facing surface of a path regulating member (41) may include a non-protruding surface that can be a concave surface that extends between two protruding portions (46).

[Supplementary Note 11] As shown in FIG. 3, in several aspects of the present disclosure, when a path regulating member (41) is attached to a first wire harness (11), the path regulating member (41) may come in contact with two protruding portions (46) of the path regulating member (41) and a radially outward facing surface of the first wire harness (11) at a portion of the non-protruding surface of the path regulating member (41), a gap may be formed between another portion of the non-protruding surface of the path regulating member (41) excluding the portion of the non-protruding surface and the radially outward facing surface of the first wire harness (11), and the gap may span the entire length of the path regulating member (41).

The disclosed embodiments and modification examples are illustrative in all regards and not to be construed as limiting. The scope of the present disclosure is defined by the claims and not by the above description, and all changes that come within the meaning and range of equivalency of the claims are intended to be embraced therein.

The invention claimed is:

1. A composite wire harness comprising:
    a first wire harness including a first electric wire and a first exterior tube that covers the first electric wire;
    a second wire harness including a second electric wire and a second exterior tube that covers the second electric wire and is arranged in parallel with the first exterior tube; and
    a fixing member configured to fix the first wire harness and the second wire harness to each other, wherein:
        the first wire harness includes a path regulator that is attached to an outer circumferential surface of the first exterior tube, and is configured to regulate a path of the first exterior tube,
        the path regulator includes an insertion port that extends along a length direction of the path regulator and spans an entire length of the path regulator,
        the fixing member fixes the second wire harness to the path regulator,
        the path regulator is a first path regulator,
        the second wire harness includes a second path regulator that is attached to an outer circumferential surface of the second exterior tube, and is configured to regulate a path of the second exterior tube,
        the second path regulator includes an insertion port that extends along a length direction of the second path regulator and spans an entire length of the second path regulator,
        the fixing member is a first fixing member, and the second wire harness includes a second fixing member that is configured to fix the first exterior tube to the second path regulator, and
        an entire length of the first path regulator overlaps a portion of the second exterior tube where the second path regulator is not attached, as seen in a direction perpendicular to the length direction of the second path regulator of the first exterior tube and the second exterior tube.

2. The composite wire harness according to claim 1, wherein:
    the first wire harness includes a plurality of path regulators, including the first path regulator, that are attached to the first exterior tube along a length direction of the first exterior tube, and
    the plurality of path regulators are spaced apart from each other in the length direction of the first exterior tube.

3. The composite wire harness according to claim 1, wherein:
    the first path regulator includes:
        a first end and a second end that are circumferential ends of the first path regulator and form the insertion port; and
        at least one protrusion that protrudes from an inner surface of at least one of the first end and the second end and respectively come into contact with an outer surface of the first exterior tube.

\* \* \* \* \*